United States Patent
Kinstlich et al.

(10) Patent No.: US 11,681,140 B2
(45) Date of Patent: Jun. 20, 2023

(54) MEMS MIRROR DRIVEN BY DUAL PULSE DRIVE SIGNAL

(71) Applicant: STMicroelectronics Ltd, Netanya (IL)

(72) Inventors: Sivan Kinstlich, Tel Aviv-Jaffa (IL); Offir Duvdevany, Tel Aviv (IL)

(73) Assignee: STMicroelectronics Ltd, Netanya (IL)

( * ) Notice: Subject to any disclaimer, the term of this patent is extended or adjusted under 35 U.S.C. 154(b) by 503 days.

(21) Appl. No.: 16/855,301

(22) Filed: Apr. 22, 2020

(65) Prior Publication Data

US 2020/0249465 A1    Aug. 6, 2020

Related U.S. Application Data

(62) Division of application No. 15/722,444, filed on Oct. 2, 2017, now Pat. No. 10,684,465.

(51) Int. Cl.
*G02B 26/08* (2006.01)

(52) U.S. Cl.
CPC ................. *G02B 26/0833* (2013.01)

(58) Field of Classification Search
CPC . G02B 26/0833; G02B 26/122; G02B 26/105
See application file for complete search history.

(56) References Cited

U.S. PATENT DOCUMENTS

2004/0120022 A1    6/2004  Cannon et al.
2005/0151592 A1*   7/2005  Partridge ............... H03L 1/027
                                                  331/16

* cited by examiner

*Primary Examiner* — Euncha P Cherry
(74) *Attorney, Agent, or Firm* — Crowe & Dunlevy

(57) ABSTRACT

Mirror control circuitry operates to control a movable mirror. The mirror control circuitry includes drive circuitry for providing a drive signal to the movable mirror, and a processor. The processor causes the drive circuitry to generate the drive signal so as to have pulses with leading edges occurring an offset period of time after a maximum opening angle of the movable mirror and trailing edges occurring an offset period of time before a zero crossing of the movable mirror. The processor may sample a mirror sense signal from the movable mirror at times at which a derivative of capacitance of the movable mirror with respect to time is zero, and then perform an action based upon the samples.

28 Claims, 6 Drawing Sheets

MEMS MIRROR DRIVEN BY DUAL PULSE DRIVE SIGNAL

RELATED APPLICATION

This is a divisional of U.S. patent application Ser. No. 15/722,444, filed on Oct. 2, 2017, the contents of which are incorporated by reference to the maximum extent allowable under the law.

TECHNICAL FIELD

This disclosure relates to a technique for driving an oscillating mirror with a drive signal that produces at least two drive pulses per each period of mirror oscillation.

BACKGROUND

Certain devices such as wafer defect scanners, laser printers, augmented reality devices, document scanners, projectors and the like often employ a laser beam that scans across a surface in a straight or curved line path. These devices employ tilting mirrors to deflect the beam to perform the scanning. These tilting mirrors may be, or may include, Micro Electro Mechanical Systems ("MEMS") devices. The actuation of mirrors used in MEMS devices, referred to herein as MEMS mirrors, can be via the electromagnetic, electrostatic, piezoelectric, and thermoelectric effects, depending on application.

One type of common MEMS mirror includes a stator and a rotor, with the rotor or structures carried by the rotor being reflective. The stator and/or rotor are driven with a drive signal which results in the rotor oscillating with respect to the stator, thereby changing the angle of reflectance of an incident light beam on the rotor. By oscillating the rotor between two orientations, an opening angle of the mirror is defined, and scanning of the light beam across the surface is accomplished.

Current control schemes for such a MEMS mirror involve the use of a drive signal with a single pulse per each period of mirror oscillation. A single pulse is utilized so as to permit adequate time for sampling of an output signal from the MEMS mirror for use in a control loop.

However, the use of a single pulse brings with it certain drawbacks. For example, in order to achieve a given opening angle, the magnitude of the voltage of the mirror drive signal may be required to be relatively high, and the generation of such high voltages in a portable electronic device may prove burdensome. In addition, the use of a single pulse and the accompanying high voltage may result in spurious drive modes, which is also undesirable.

Therefore, there is a need for new control schemes for MEMS mirrors that overcome these drawbacks.

SUMMARY

Disclosed herein is a device including mirror control circuitry for controlling a movable mirror. The mirror control circuitry includes drive circuitry for providing a drive signal to the movable mirror, and a processor. The processor is configured to cause the drive circuitry to generate the drive signal so as to have pulses associated with times at which a derivative of a capacitance of the movable mirror with respect to time is zero.

The association between the pulses and the time at which the derivative of the capacitance of the movable mirror with respect to time is zero may be that a rising edge of each pulse occurs an offset period of time after each time at which the derivative of capacitance of the movable mirror with respect to time is zero but an opening angle of the movable mirror is nonzero, and that a falling edge of each pulse occurs an offset period of time before each time at which the opening angle of the movable mirror is zero.

The pulses of the drive signal may be generated so as to be trapezoidal in shape.

The processor may be further configured to receive a mirror sense signal from the movable mirror, take first and second samples of the mirror sense signal, both samples being taken between pulses of the drive signal, determine at least one property of the movable mirror as a function of the first and second samples, and perform an action based upon the determined at least one property.

The determined at least one property may be the opening angle of the movable mirror, and the action performed may be to adjust the drive circuitry such that the opening angle matches a desired opening angle.

The determined at least one property may be that the movable mirror has failed, and wherein the action performed may be to generate a flag indicating that the mirror has failed.

The processor may be configured to receive a mirror sense signal from the movable mirror, take a first sample of the mirror sense signal at a zero crossing of the opening angle of the movable mirror, take a second sample of the mirror sense signal at a next occurrence of a time at which the derivative of the capacitance of the movable mirror with respect to time is zero, and perform an action based upon the determined at least one property.

The processor may cause the drive circuitry to generate the drive signal so as to have the pulses transition from deasserted to asserted at an offset period of time after each time at which the derivative of the capacitance of the movable mirror with respect to time is zero and the opening angle of the movable mirror is nonzero.

The times at which the derivative of opening angle of the movable mirror with respect to time is zero and the opening angle of the movable mirror is nonzero represent maximums or minimums of the opening angle of the movable mirror.

The movable mirror may be an oscillating micromirror.

Also disclosed herein is a method of driving a movable mirror including generating a drive signal for the movable mirror so as to have a respective different pulse generated an offset period of time after each time at which an opening angle of the movable mirror is at a maximum or minimum, sampling a mirror sense signal from the movable mirror at least once between pulses of the drive signal (or sampling the mirror sense signal twice per each period of the drive signal), and performing at least one action as a function of the sampled mirror sense signal.

The drive signal may be generated so as to have a respective pulse transition from deasserted to asserted an offset period of time after each time at which the opening angle of the movable mirror is at a maximum or a minimum.

The method may include determining the phase between the mirror sense signal and the drive signal, and the action performed may be to adjust the drive signal such that the phase angle matches a desired phase. The desired phase may result in an opening angle of the movable mirror reaching a maximal, or close to maximal, opening angle. The adjustment of the drive signal may be an adjustment of the frequency of the drive signal to a frequency matching, or close to, the resonance frequency of the movable mirror.

The method may include determining whether the movable mirror has failed as a function of the sampled mirror sense signal, and the action performed may be to generate a flag indicating that the mirror has failed.

Also disclosed herein is a device including mirror control circuitry for controlling a movable mirror. The mirror control circuitry includes drive circuitry for providing a drive signal to the movable mirror, and a processor configured to cause the drive circuitry to generate the drive signal so as to have a frequency that is twice a frequency of oscillation of the movable mirror but does not have pulses occurring at times at which a derivative of capacitance of the movable mirror with respect to time is zero.

The processor may be further configured to receive a mirror sense signal from the movable mirror, and take first and second samples of the mirror sense signal at next two occurrences of the derivative of capacitance of the movable mirror with respect to time being zero. In some cases, the first and second samples may instead be taken during a single mirror cycle, or during a single period of the mirror sense signal.

Further disclosed herein is a device including mirror control circuitry for controlling an oscillating mirror. The mirror control circuitry may include drive circuitry for providing a drive signal to the oscillating mirror, and a processor configured to cause the drive circuitry to generate the drive signal so as to have a duty cycle that is less than one quarter of a period of oscillation of the oscillating mirror and has pulses with leading edges offset from a maximum opening angle of the oscillating mirror and trailing edges offset from a zero crossing of the opening angle of the oscillating mirror.

The processor may be further configured to receive a mirror sense signal from the oscillating mirror, and take first and second samples of the mirror sense signal at next two occurrences of the derivative of capacitance of the oscillating mirror with respect to time being zero. In some cases, the first and second samples may instead be taken during a single mirror cycle, or during a single period of the mirror sense signal.

Another method disclosed herein includes generating a drive signal for an oscillating mirror, with the drive signal being generated to have a duty cycle that is less than one quarter of a period of oscillation of the oscillating mirror and has pulses with leading edges offset from a maximum opening angle of the oscillating mirror and trailing edges offset from a zero crossing of the opening angle of the oscillating mirror.

First and second samples of a mirror sense signal may be taken at next two occurrences of the derivative of capacitance of the oscillating mirror with respect to time being zero. In some cases, the first and second samples may instead be taken during a single mirror cycle, or during a single period of the mirror sense signal. At least one property of the oscillating mirror may be determined as a function of the first and second samples.

Also disclosed herein is a laser scanning projector including a movable micromirror, drive circuitry configured to generate a drive signal for the movable micromirror to thereby cause the movable micromirror to move between first and second set rotation limits, and a processor configured to generate a mirror drive control signal for the drive circuitry to cause the drive circuitry to generate the drive signal so as to have pulses associated with times at which a derivative of capacitance of the movable micromirror with respect to time is zero.

The laser scanning projector may be configured to define a wafer detect scanner, laser printer, document scanner, augmented reality device, or pico-projector.

The association between the pulses and the time at which the derivative of the capacitance of the movable micromirror with respect to time is zero may be that a rising edge of each pulse occurs an offset period of time after each time at which the derivative of capacitance of the movable micromirror with respect to time is zero, and that a falling edge of each pulse occurs an offset period of time before each time at which an opening angle of the movable micromirror is zero.

The pulses of the drive signal may be generated so as to be trapezoidal in shape.

The processor may be further configured to receive a mirror sense signal from the movable micromirror, take first and second samples of the mirror sense signal, both samples being taken between pulses of the drive signal, and determine at least one property of the movable micromirror as a function of the first and second samples.

The determined at least one property may be a phase between the mirror drive signal and the mirror sense signal.

The determined at least one property may be that the movable micromirror has failed.

The processor may also be configured to receive a mirror sense signal from the movable micromirror, take a first sample of the mirror sense signal at a zero crossing of an opening angle of the movable micromirror, and take a second sample of the mirror sense signal at a next occurrence of a time at which the derivative of the capacitance of the movable micromirror with respect to time is zero.

The processor may cause the drive circuitry to generate the drive signal so as to have the pulses transition from deasserted to asserted at an offset period of time after each time at which the derivative of the capacitance of the movable micromirror with respect to time is zero and an opening angle of the movable micromirror is nonzero.

The times at which a derivative of an opening angle of the movable micromirror with respect to time is zero and the opening angle of the movable micromirror is nonzero may represent minimums of the opening angle of the movable micromirror.

The times at which a derivative of an opening angle of the movable micromirror with respect to time is zero and the opening angle of the movable micromirror is nonzero may represent maximums of the opening angle of the movable micromirror.

DETAILED DESCRIPTION

Figure 1:
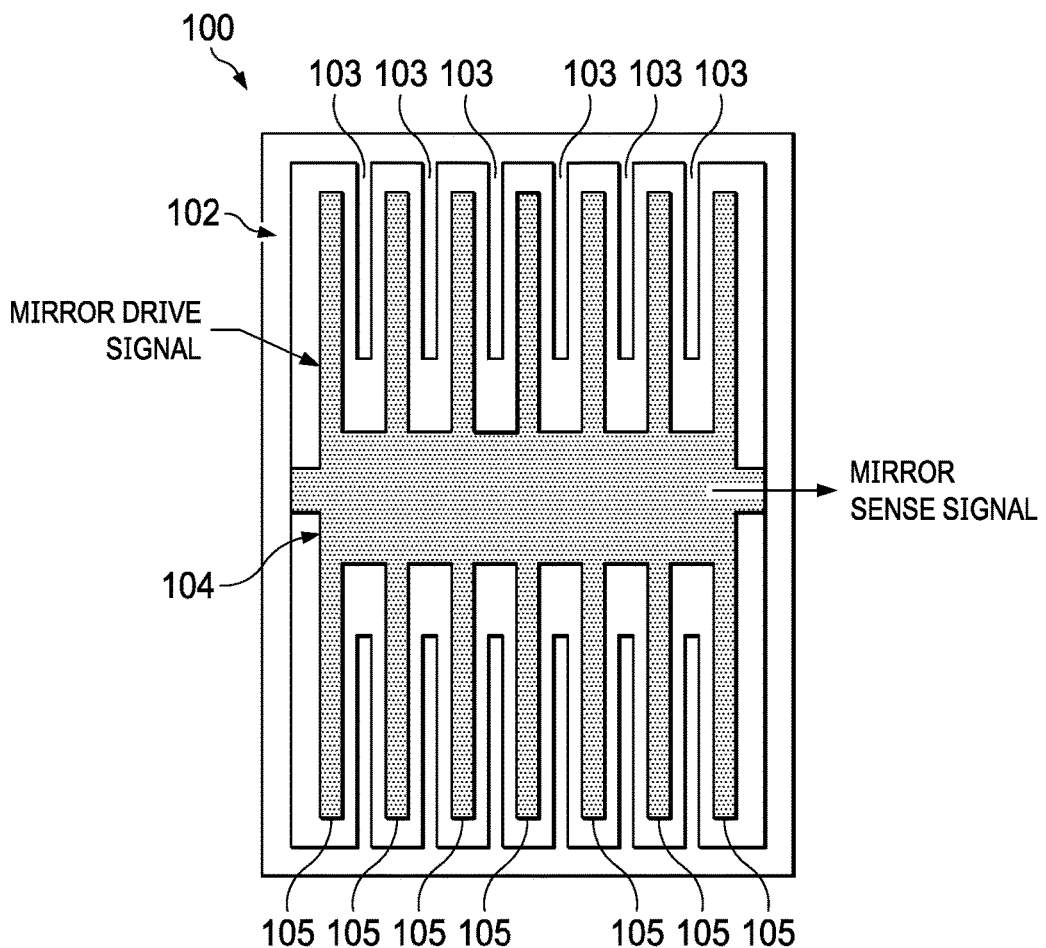
FIG. 1 is a top plan view of a movable MEMS mirror such as may be used with the techniques described in this disclosure.

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Like reference numbers in the drawing figures refer to like elements throughout.

First, a movable MEMS mirror 100, such as may be used in devices such as wafer defect scanners, laser printers, document scanners, augmented reality devices, projectors, and pico-projectors, will now be described with reference to FIG. 1. The movable MEMS mirror 100 includes a stator 102 having inwardly projecting fingers 103. A rotor 104 is positioned within the stator 102 and has outwardly projecting fingers 105 that interleave with the inwardly projecting fingers 103 of the stator 102. The rotor 104 oscillates about its axis, oscillating its mirror surface with respect to the stator 102.

Either the stator 102 or the rotor 104 is supplied with a periodic mirror drive signal, such as a square wave, while the other is supplied with a reference voltage. As shown in FIG. 1, the stator 102 is supplied with the mirror drive signal and the rotor 104 produces a mirror sense signal. In some cases, however, the rotor 104 may instead be supplied with the mirror drive signal and the stator may produce the mirror sense signal.

In the case where the mirror drive signal has an oscillating square voltage, for example, electrostatic forces cause the rotor 104 to oscillate about its axis relative to the stator 102. In the case where the mirror drive signal has an oscillating square current, for example, magnetic forces cause the rotor 104 to oscillate about its axis relative to the stator 102. Indeed, the movable MEMS mirror 100 may be driven according to any suitable way known to those of skill in the art, such as through the use of the piezoelectric effect or thermoelectric effect. As another example, the movable MEMS mirror 100 may be driven by driving current flow through a coil, creating an electromagnetic field used to drive the rotation of the rotor 104. Thus, it should be understood that the techniques, circuits, and methods described herein are applicable to any movable MEMS mirror 102, regardless of how it is driven.

For use in scanning a light beam across a surface, the movable MEMS mirror 100 is driven so that it oscillates at a frequency close to its resonant frequency between two set or controllable oscillation limits. In some cases, the movable MEMS mirror 100 may be driven outside of its resonance frequency, for example driven in a quasi-static or linear mode.

Figure 2:
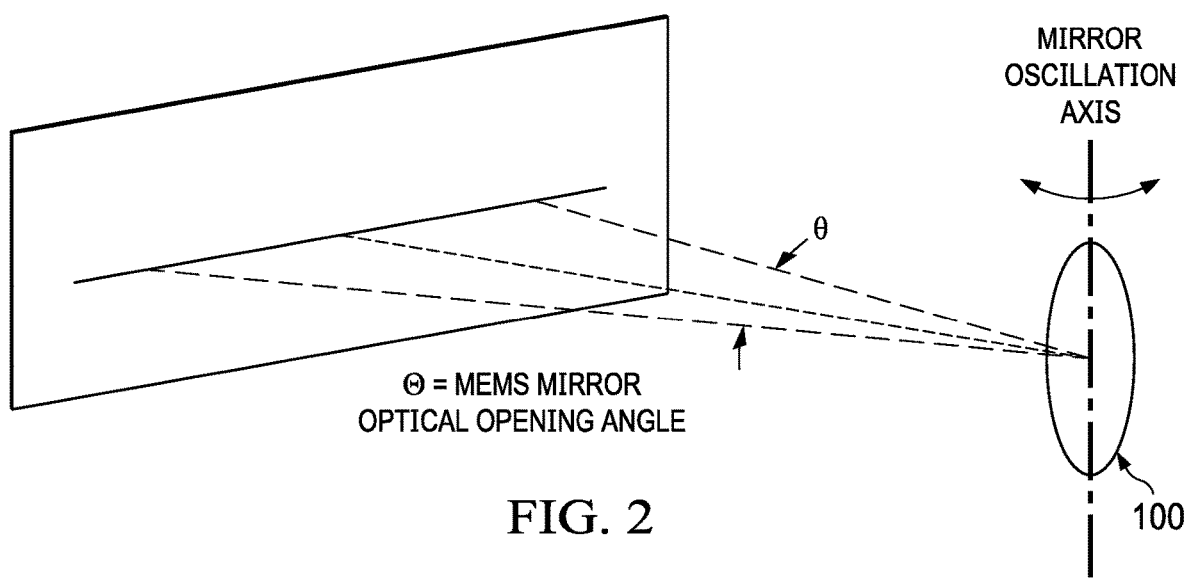
FIG. 2 is a perspective view showing operation of a movable MEMS mirror scanning.
Figure 3:
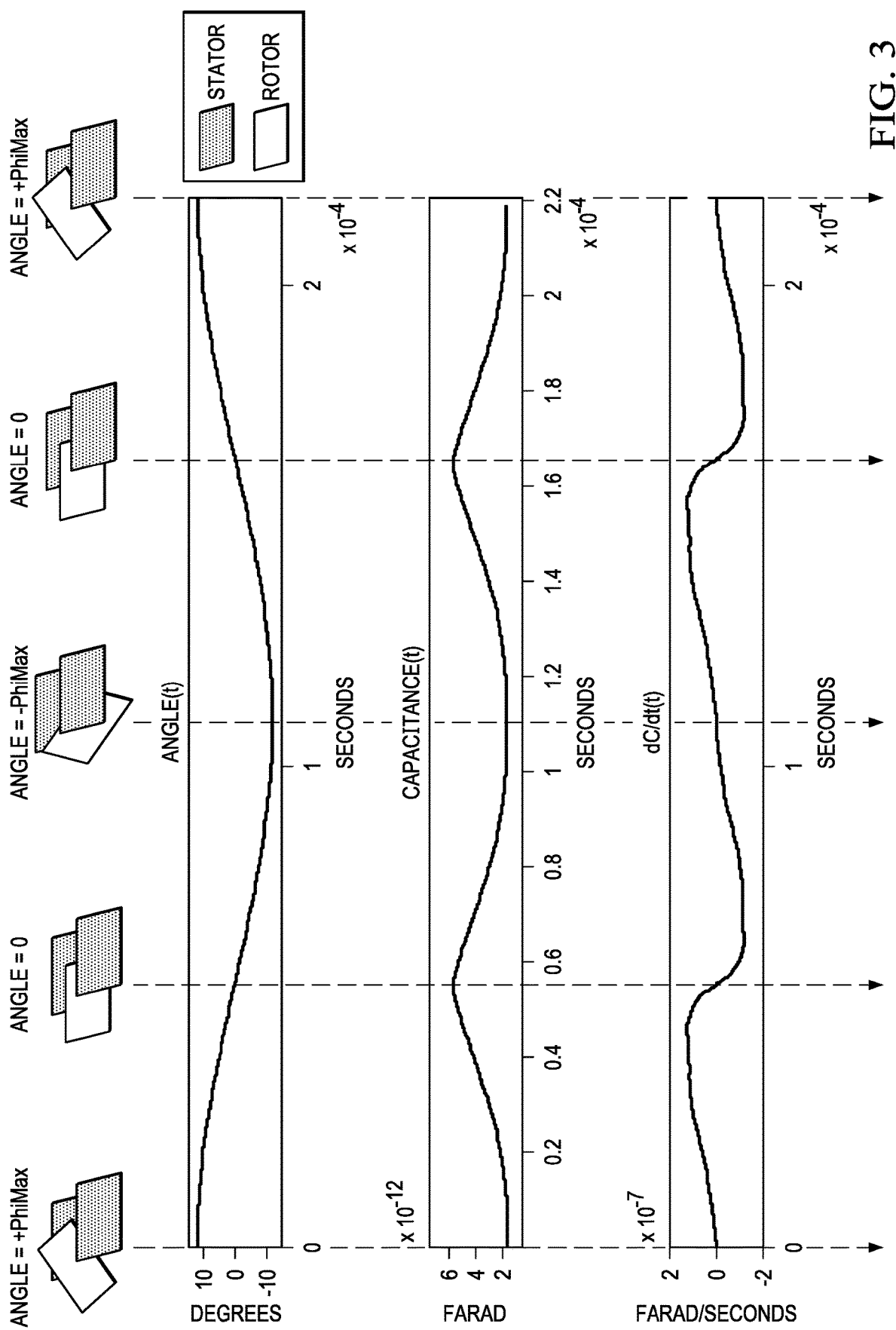
FIG. 3 is a graph showing the opening angle of a movable MEMS mirror vs its capacitance.

Shown in FIG. 2 is the movable MEMS mirror 100 scanning a light beam across a projection screen between two set rotation limits that define an "opening angle" θ of the movable MEMS mirror 100. As can be seen in the graphs of FIG. 3, the opening angle θ of the movable MEMS mirror 100 is related to the capacitance of the movable MEMS mirror 100. The capacitance of the movable MEMS mirror 100 peaks when the opening angle θ is at zero, as can be seen. Thus, as can also be seen, the derivative of capacitance of the movable MEMS mirror 100 with respect to time is zero where the opening angle θ is zero, where the opening angle θ is at a maximum, and where the opening angle θ is at a minimum.

Figure 4:
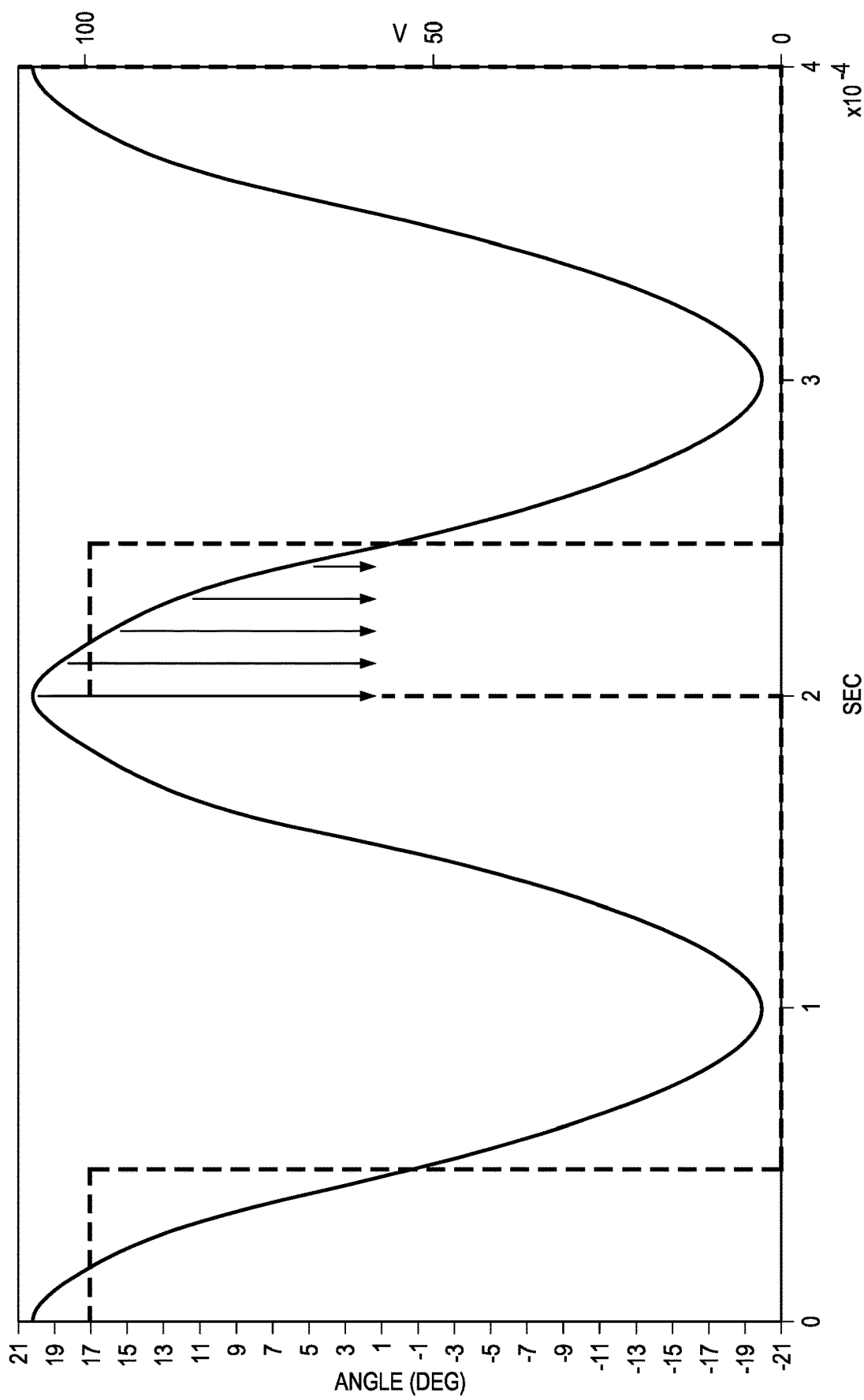
FIG. 4 is a graph showing a typical drive signal for a movable MEMS mirror overlaid with the opening angle of that movable MEMS mirror over time.

A typical mirror drive signal is shown in FIG. 4. As can be seen, the mirror drive signal is a square wave that transitions low to high, or deasserted to asserted, at each maximum value of the opening angle θ. As explained above, however, this mirror drive signal has drawbacks such as the need for a relatively high magnitude voltage.

Figure 5:
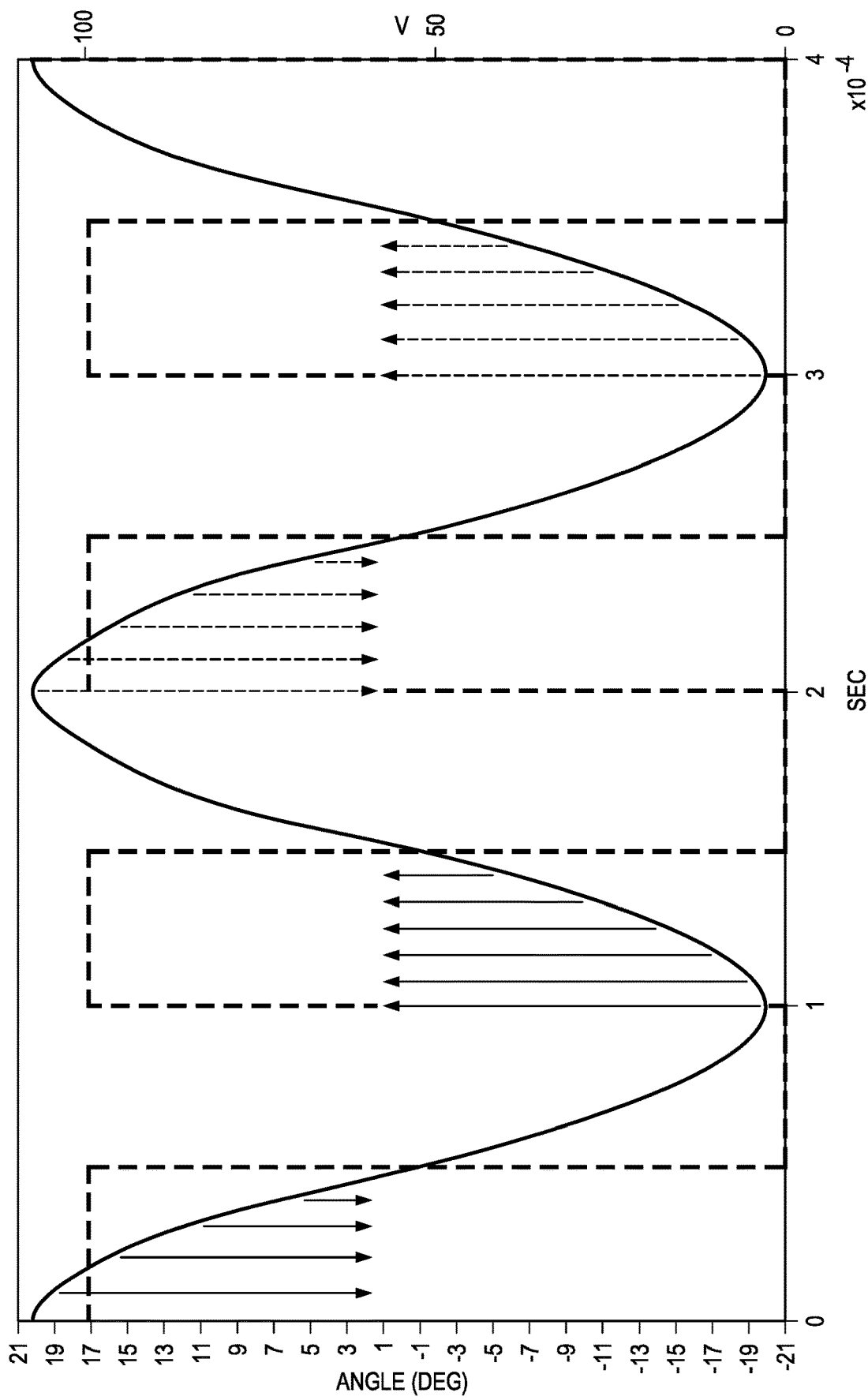
FIG. 5 is a graph showing a typical dual drive signal for a movable MEMS mirror overlaid with the opening angle of that movable MEMS mirror over time.

An improved mirror drive signal is shown in FIG. 5. Here, the mirror drive signal is a square wave that transitions low to high, or deasserted to asserted, at each maximum, as well as each minimum, value of the opening angle θ, making the mirror drive signal symmetric. This provides for twice the duty cycle of a conventional mirror drive signal. Stated another way, the frequency of this mirror drive signal is twice that of the opening angle θ of the movable MEMS mirror 100. Stated yet another way, this mirror drive signal includes two pulses per each period of mirror oscillation, each occurring at time when the derivative of capacitance of the movable MEMS mirror 100 is zero. This allows for the mirror drive signal to have a lower voltage magnitude to achieve a given opening angle θ than required by the mirror drive signal shown in FIG. 4. This lower voltage magnitude and allows for the construction of a more robust movable MEMS mirror 100. In addition, this provides for a longer effective application of torque to the movable MEMS mirror 100 than would be applied by the mirror drive signal shown in FIG. 4. This also reduces the occurrence of spurious drive modes.

Figure 6:
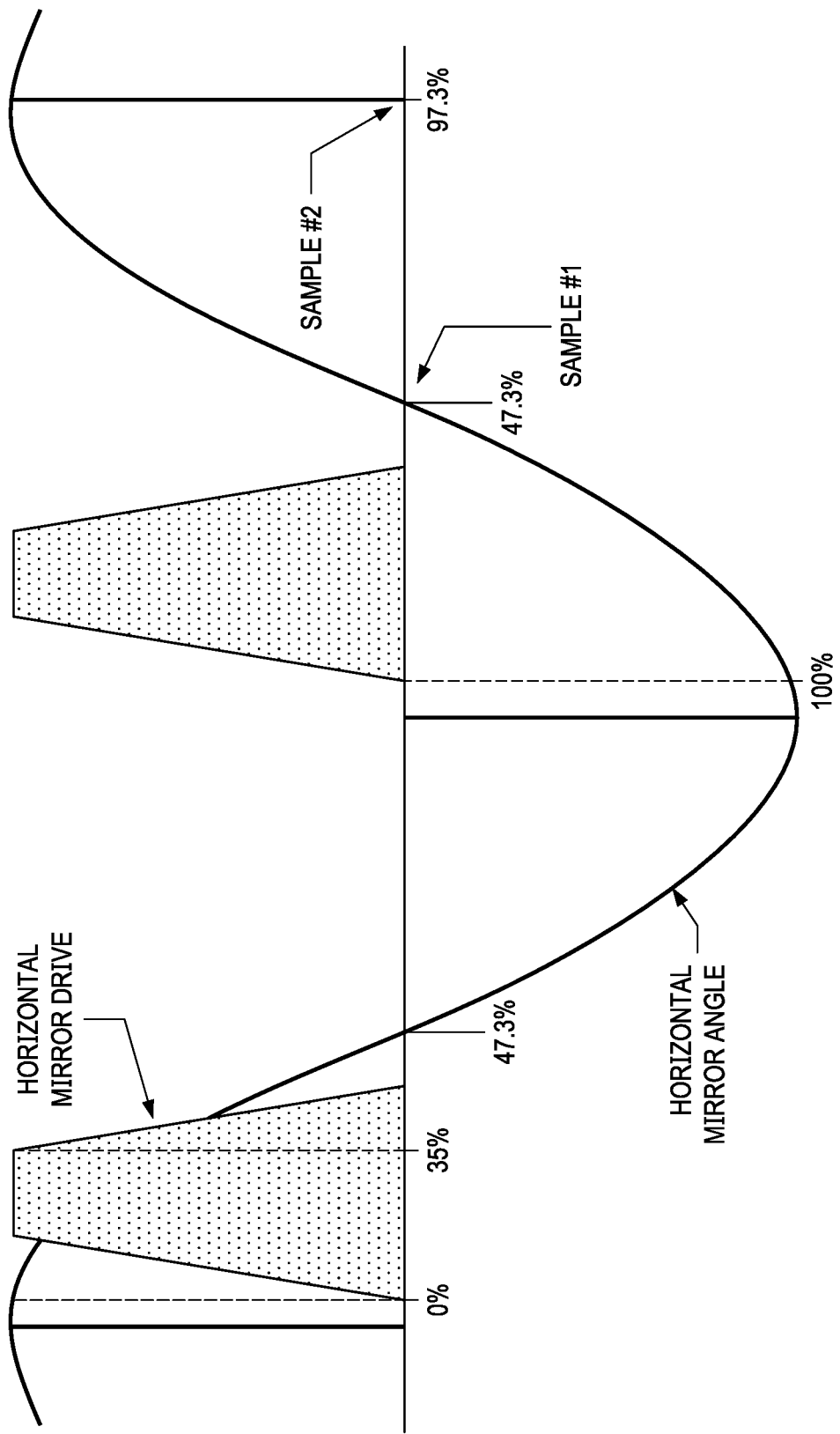
FIG. 6 is a graph showing a dual drive signal for a movable MEMS mirror overlaid with the opening angle of that movable MEMS mirror over time, as well as acquisition points for sampling the mirror sense signal of that movable MEMS mirror, in accordance with techniques disclosed herein.
Figure 7:
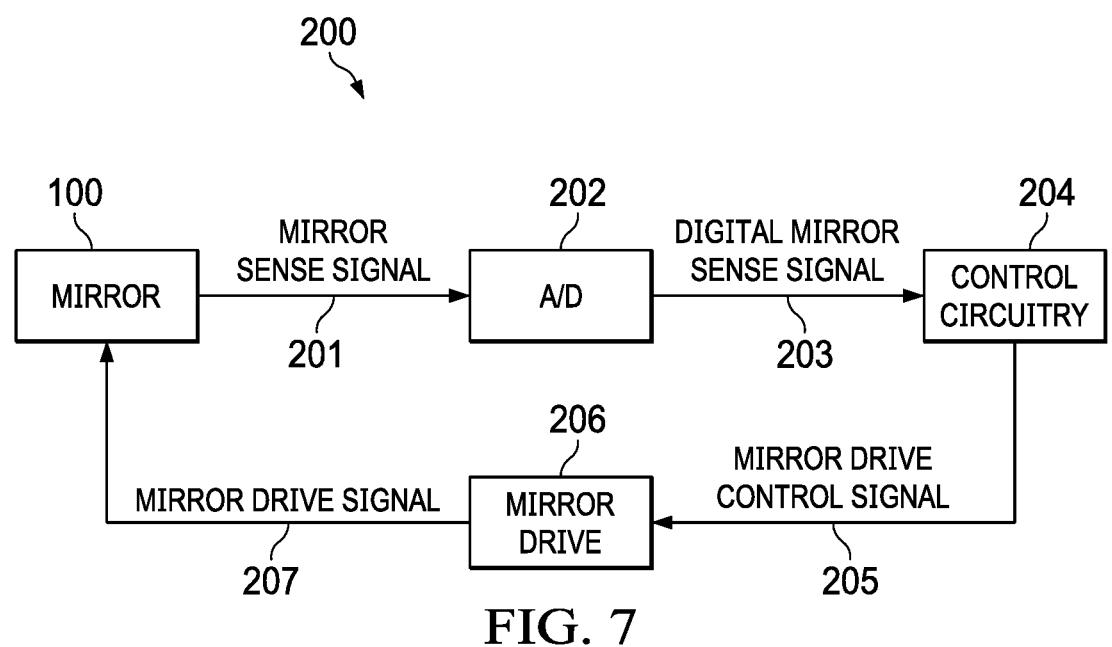
FIG. 7 is a schematic block diagram showing drive and control circuitry for driving a movable MEMS mirror in accordance with a drive technique described herein.

However, due to the longer effective application of torque to the movable MEMS mirror 100, the available duration for sampling the mirror sense signal 201 when it is not saturated is shorter. Therefore, a further improved mirror drive signal shown in FIG. 6 has been developed, which will now be described together with the device 200 of FIG. 7 implementing a movable MEMS mirror 100 using this mirror drive signal. The device 200 includes an analog to digital converter 202 coupled to receive a mirror sense signal 201 from the mirror 100 and convert it into a digital mirror sense signal 203. Control circuitry 204 receives the digital mirror sense signal 203 and converts it to a mirror drive control signal 205. Mirror drive circuitry 206 receives the mirror drive control signal 205 and generates the mirror drive signal 207 (shown in FIG. 6) from the mirror drive control signal 205.

As can be seen, this mirror drive signal 207 has pulses that are offset from the maximum and minimum opening angles θ. This offset can be seen in FIG. 6 in which the offset between the leading edge of the mirror drive signal pulses and the maximum opening angle is about 3%, and the offset between the trailing edge of the drive pulses and the zero crossings is about 8%. These are sample offsets, however, and other offsets may be used. The offsets as shown permit sampling of the mirror sense signal 201 at a zero crossing of the opening angle θ, and at a next maximum or minimum (whichever occurs first) opening angle θ. That is, the rising edge of each pulse of the mirror drive signal 207 begins an offset period of time after occurrence of a maximum or minimum opening angle θ. In addition, the shape of each pulse may be trapezoidal, thereby lowering the duty cycle compared to the rectangular pulses of the mirror drive signal 207 of FIG. 5, further increasing the sampling region. This duty cycle may be less than one quarter of a period of oscillation of the movable MEMS mirror 100. Moreover, it is noted that the pulses of the mirror drive signal 207 have leading edges offset (after) from a maximum opening angle θ and trailing edges offset (before) from a zero crossing of the opening angle θ. This mirror drive signal 207 is also symmetric, providing for twice the duty cycle of a conventional single pulse mirror drive signal. Stated another way, the frequency of this mirror drive signal 207 is twice that of the opening angle θ of the movable MEMS mirror 100. Stated yet another way, this mirror drive signal 207 includes two pulses per each period of mirror oscillation, each occurring at time offset from and subsequent to when the derivative of capacitance of the movable MEMS mirror 100 is zero.

As stated above, the mirror sense signal 201 may be sampled at a zero crossing of the opening angle θ, and at a next maximum or minimum (whichever occurs first) opening angle θ. In some instances, the mirror sense signal 201 can be sampled at the next two occurrences of the derivative of capacitance of the movable MEMS mirror 100 with respect to time being zero, although the samples can also be taken at other locations. For example, the samples can be taken at two configured points in the mirror cycle. These points are configured by a percentage of one line (i.e. half a mirror cycle). For example, in FIG. 5, the samples can be taken at 47.3% and 97.3% (and thus there is always a 50% difference).

From these samples, the phase of the movable MEMS mirror 100 may be determined, and the frequency of the mirror drive control signal 205 can be adjusted so that the mirror drive signal 207 results in a desired phase. The desired phase is an optimal state in which the opening angle θ is at or close to a maximum value. In this state, the frequency off the drive signal at or close to the resonance frequency of the movable MEMS mirror 100.

In addition, from the phase, it may be determined that the movable MEMS mirror 100 has failed, and an appropriate flag may be set for use by other circuitry, for example to switch off a laser impinging onto the movable MEMS mirror 100.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A device, comprising:
  mirror control circuitry configured to control a movable mirror, wherein the mirror control circuitry comprises:
    drive circuitry configured to provide a drive signal to the movable mirror; and
    a processor configured to:
      cause the drive circuitry to generate the drive signal so as to have pulses associated with times at which a derivative of capacitance of the movable mirror with respect to time is zero.

2. The device of claim 1, wherein said times at which the derivative of the capacitance of the movable mirror with respect to time is zero comprise a rising edge of each pulse that occurs an offset period of time after each time at which the derivative of capacitance of the movable mirror with respect to time is zero but an opening angle of the movable mirror is nonzero, and that a falling edge of each pulse occurs an offset period of time before each time at which the opening angle of the movable mirror is zero.

3. The device of claim 1, wherein the drive signal generates pulses of the drive signal that are trapezoidal in shape.

4. The device of claim 1, wherein the processor is further configured to:
  receive a mirror sense signal from the movable mirror;
  take first and second samples of the mirror sense signal, both samples being taken between pulses of the drive signal;
  determine at least one property of the movable mirror as a function of the first and second samples; and
  perform an action based upon the determined at least one property.

5. The device of claim 4, wherein the determined at least one property is a phase between the mirror drive signal and the mirror sense signal; and wherein the action performed is to adjust the drive circuitry such that the phase matches a desired phase.

6. The device of claim 4, wherein the determined at least one property is that the movable mirror has failed; and wherein the action performed is to generate a flag indicating that the mirror has failed.

7. The device of claim 4, wherein the processor is configured to:
  receive a mirror sense signal from the movable mirror;
  take a first sample of the mirror sense signal at a zero crossing of an opening angle of the movable mirror;
  take a second sample of the mirror sense signal at a next occurrence of a time at which the derivative of the capacitance of the movable mirror with respect to time is zero;
  perform an action based upon the determined at least one property.

8. The device of claim 1, wherein the processor causes the drive circuitry to generate the drive signal so as to have pulses which transition from deasserted to asserted at an offset period of time after each time at which the derivative of the capacitance of the movable mirror with respect to time is zero and an opening angle of the movable mirror is nonzero.

9. The device of claim 1, wherein the times at which a derivative of an opening angle of the movable mirror with respect to time is zero and an opening angle of the movable mirror is nonzero represent maximums or minimums of the opening angle of the movable mirror.

10. The device of claim 1, wherein the movable mirror comprises an oscillating micromirror.

11. A device, comprising:
  mirror control circuitry configured to control a movable mirror, the mirror control circuitry comprising:
    drive circuitry configured to provide a drive signal to the movable mirror; and
    a processor configured to cause the drive circuitry to generate the drive signal having a frequency that is twice a frequency of oscillation of the movable mirror but does not have pulses occurring at times at which a derivative of capacitance of the movable mirror with respect to time is zero.

12. The device of claim 11, wherein the processor is further configured to:

receive a mirror sense signal from the movable mirror; and take first and second samples of the mirror sense signal at next two occurrences of the derivative of capacitance of the movable mirror with respect to time being zero.

13. A device, comprising:
mirror control circuitry configured to control an oscillating mirror, wherein the mirror control circuitry comprises:
drive circuitry configured to provide a drive signal to the oscillating mirror; and
a processor configured to cause the drive circuitry to generate the drive signal so as to have a duty cycle that is less than one quarter of a period of oscillation of the oscillating mirror and has pulses with leading edges offset from a maximum opening angle of the oscillating mirror and trailing edges offset from a zero crossing of the opening angle of the oscillating mirror.

14. The device of claim 13, wherein the processor is further configured to:
receive a mirror sense signal from the oscillating mirror; and
take first and second samples of the mirror sense signal at next two occurrences of a derivative of capacitance of the oscillating mirror with respect to time being zero.

15. A method, comprising:
generating a drive signal for an oscillating mirror; and
wherein the drive signal is generated to have a duty cycle that is less than one quarter of a period of oscillation of the oscillating mirror and has pulses with leading edges offset from a maximum opening angle of the oscillating mirror and trailing edges offset from a zero crossing of an opening angle of the oscillating mirror.

16. The method of claim 15, further comprising taking first and second samples of a mirror sense signal at next two occurrences of a derivative of capacitance of the oscillating mirror with respect to time being zero.

17. The method of claim 16, further comprising determining at least one property of the oscillating mirror as a function of the first and second samples.

18. A laser scanning projector, comprising:
a movable micromirror;
drive circuitry configured to generate a drive signal for the movable micromirror to thereby cause the movable micromirror to move between first and second set rotation limits; and
a processor configured to generate a mirror drive control signal for the drive circuitry to cause the drive circuitry to generate the drive signal so as to have pulses associated with times at which a derivative of capacitance of the movable micromirror with respect to time is zero.

19. The laser scanning projector of claim 18, wherein the laser scanning projector is configured to define a wafer detect scanner, laser printer, document scanner, augmented reality device, or pico-projector.

20. The laser scanning projector of claim 18, wherein the association between the pulses and the time at which the derivative of the capacitance of the movable micromirror with respect to time is zero is that a rising edge of each pulse occurs an offset period of time after each time at which the derivative of capacitance of the movable micromirror with respect to time is zero, and that a falling edge of each pulse occurs an offset period of time before each time at which an opening angle of the movable micromirror is zero.

21. The laser scanning projector of claim 18, wherein the pulses of the drive signal are generated so as to be trapezoidal in shape.

22. The laser scanning projector of claim 18, wherein the processor is further configured to:
receive a mirror sense signal from the movable micromirror;
take first and second samples of the mirror sense signal, both samples being taken between pulses of the drive signal; and
determine at least one property of the movable micromirror as a function of the first and second samples.

23. The laser scanning projector of claim 22, wherein the determined at least one property is a phase between the mirror drive signal and the mirror sense signal.

24. The laser scanning projector of claim 22, wherein the determined at least one property is that the movable micromirror has failed.

25. The laser scanning projector of claim 18, wherein the processor is configured to:
receive a mirror sense signal from the movable micromirror;
take a first sample of the mirror sense signal at a zero crossing of an opening angle of the movable micromirror; and
take a second sample of the mirror sense signal at a next occurrence of a time at which the derivative of the capacitance of the movable micromirror with respect to time is zero.

26. The laser scanning projector of claim 18, wherein the processor causes the drive circuitry to generate the drive signal so as to have the pulses transition from deasserted to asserted at an offset period of time after each time at which the derivative of the capacitance of the movable micromirror with respect to time is zero and an opening angle of the movable micromirror is nonzero.

27. The laser scanning projector of claim 18, wherein the times at which a derivative of an opening angle of the movable micromirror with respect to time is zero and the opening angle of the movable micromirror is nonzero represent minimums of the opening angle of the movable micromirror.

28. The laser scanning projector of claim 18, wherein the times at which a derivative of an opening angle of the movable micromirror with respect to time is zero and the opening angle of the movable micromirror is nonzero represent maximums of the opening angle of the movable micromirror.

* * * * *